(12) United States Patent
Halliday et al.

(10) Patent No.: US 10,730,691 B2
(45) Date of Patent: Aug. 4, 2020

(54) BEVERAGE PREPARATION SYSTEM, A CAPSULE AND A METHOD FOR FORMING A BEVERAGE

(71) Applicant: Koninklijke Douwe Egberts B.V., Utrecht (NL)

(72) Inventors: Andrew Halliday, Banbury (GB); Esak Shabudin, Banbury (GB); Simon Jelley, Cambridge (GB); Stuart Banister, Peterborough (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 342 days.

(21) Appl. No.: 14/786,520

(22) PCT Filed: May 16, 2014

(86) PCT No.: PCT/IB2014/000852
§ 371 (c)(1),
(2) Date: Oct. 22, 2015

(87) PCT Pub. No.: WO2014/184651
PCT Pub. Date: Nov. 20, 2014

(65) Prior Publication Data
US 2016/0083174 A1 Mar. 24, 2016

(30) Foreign Application Priority Data

May 17, 2013 (GB) .................................. 1308927.1

(51) Int. Cl.
*B65D 85/804* (2006.01)
*A23F 5/26* (2006.01)
*A47J 31/40* (2006.01)

(52) U.S. Cl.
CPC .......... *B65D 85/8043* (2013.01); *A23F 5/262* (2013.01); *A47J 31/407* (2013.01)

(58) Field of Classification Search
CPC ..... B66D 85/8043; A47J 31/407; A23F 5/262
See application file for complete search history.

(56) References Cited

U.S. PATENT DOCUMENTS

| | | |
|---|---|---|
| 3,233,813 A | 2/1966 | Yoss |
| 3,987,720 A | 10/1976 | Hill |
| (Continued) | | |

FOREIGN PATENT DOCUMENTS

| | | |
|---|---|---|
| CA | 2067515 | 2/1999 |
| CN | 1479692 | 3/2004 |
| (Continued) | | |

OTHER PUBLICATIONS

Combined Search and Examination Report, dated Oct. 10, 2013 for United Kingdom Patent Application No. GB1308929.7 (7 pgs.).

(Continued)

*Primary Examiner* — Viren A Thakur
*Assistant Examiner* — Chaim A Smith
(74) *Attorney, Agent, or Firm* — Fitch, Even, Tabin & Flannery LLP (57) ABSTRACT

A beverage producing system is provided comprising a capsule containing beverage ingredients and a beverage preparation machine. The capsule comprises a cup-shaped body and a lid; the cup-shaped body having a base and a side wall and the lid being sealed to the cup-shaped body. The side wall is dimensioned to be contacted by an enclosing member of the beverage preparation machine on closure of the enclosing member to buckle the side wall to form a valley zone bridging the enclosing member. The side wall is adapted such that said valley zone forms at least one sealing interface between the enclosing member and the side wall. A capsule and a method are also disclosed.

28 Claims, 5 Drawing Sheets

(56) References Cited

U.S. PATENT DOCUMENTS

| | | | |
|---|---|---|---|
| 4,513,015 A | 4/1985 | Clough | |
| 4,762,514 A | 8/1988 | Yoshida | |
| 4,865,217 A | 9/1989 | Yoshimoto | |
| 5,098,751 A | 3/1992 | Tamura | |
| 5,178,293 A | 1/1993 | Suzuki | |
| 5,656,311 A | 8/1997 | Fond | |
| 5,897,899 A | 4/1999 | Fond | |
| 6,371,335 B1 | 4/2002 | MacEwen | |
| 6,461,697 B1 | 10/2002 | Slat | |
| 7,556,191 B2 | 7/2009 | Hewitt | |
| 7,658,141 B2 | 2/2010 | Masek | |
| 8,161,866 B2 | 4/2012 | Kollep | |
| 2001/0041702 A1 | 11/2001 | Crocker | |
| 2003/0071056 A1 | 4/2003 | Hale | |
| 2005/0109653 A1 | 5/2005 | Wnek | |
| 2006/0110507 A1* | 5/2006 | Yoakim | A47J 31/3628 426/433 |
| 2008/0299262 A1 | 12/2008 | Reati | |
| 2009/0320692 A1 | 12/2009 | Simanski | |
| 2010/0015307 A1* | 1/2010 | Abegglen | B29C 45/045 426/392 |
| 2010/0064899 A1 | 3/2010 | Aardenburg | |
| 2010/0239717 A1 | 9/2010 | Yoakim | |
| 2011/0020500 A1 | 1/2011 | Eichler | |
| 2011/0041702 A1 | 2/2011 | Yoakim | |
| 2011/0185910 A1 | 8/2011 | Ryser | |
| 2011/0186450 A1 | 8/2011 | Bonacci | |
| 2011/0272317 A1 | 11/2011 | Wnek | |
| 2011/0297005 A1 | 12/2011 | Mariller | |
| 2012/0031794 A1 | 2/2012 | Ozanne | |
| 2012/0210878 A1 | 8/2012 | Mariller | |
| 2012/0225168 A1 | 9/2012 | Kamerbeek | |
| 2012/0301581 A1 | 11/2012 | Abegglen | |
| 2013/0087051 A1 | 4/2013 | Frydman | |
| 2013/0092910 A1 | 4/2013 | Seo | |
| 2013/0341478 A1 | 12/2013 | Mariller | |
| 2014/0087028 A1 | 3/2014 | Orsi | |
| 2014/0234494 A1 | 8/2014 | Doglioni Majer | |
| 2016/0066591 A1 | 3/2016 | Halliday | |
| 2016/0075506 A1 | 3/2016 | Chapman | |

FOREIGN PATENT DOCUMENTS

| | | |
|---|---|---|
| CN | 101043835 | 9/2007 |
| CN | 101287662 | 10/2008 |
| CN | 101432118 | 5/2009 |
| CN | 101432207 | 5/2009 |
| CN | 101454227 | 6/2009 |
| CN | 101686771 | 3/2010 |
| CN | 101970314 | 2/2011 |
| CN | 101992905 | 3/2011 |
| CN | 101992906 | 3/2011 |
| DE | 3641127 | 6/1988 |
| DE | 102008014758 | 10/2009 |
| EP | 468079 | 1/1992 |
| EP | 468080 | 1/1992 |
| EP | 512468 | 11/1992 |
| EP | 521186 | 1/1993 |
| EP | 0521510 | 1/1993 |
| EP | 524464 | 1/1993 |
| EP | 1344724 | 9/2003 |
| EP | 1369069 A2 | 12/2003 |
| EP | 1440908 | 7/2004 |
| EP | 1654966 A1 | 5/2006 |
| EP | 1700548 A1 | 9/2006 |
| EP | 1839543 | 10/2007 |
| EP | 1849715 A1 | 10/2007 |
| EP | 1816936 | 7/2008 |
| EP | 2098144 | 9/2009 |
| EP | 2100824 A1 | 9/2009 |
| EP | 2151313 A1 | 2/2010 |
| EP | 2165937 | 3/2010 |
| EP | 2279845 | 2/2011 |
| EP | 2284100 A1 | 2/2011 |
| EP | 2284101 | 2/2011 |
| EP | 2289820 | 3/2011 |
| EP | 2308776 | 4/2011 |
| EP | 2347976 | 7/2011 |
| EP | 2489609 A1 | 8/2012 |
| EP | 2210827 | 9/2012 |
| EP | 2562101 | 2/2013 |
| EP | 2287090 | 5/2013 |
| EP | 2607264 | 6/2013 |
| EP | 2631198 | 8/2013 |
| EP | 2631199 | 8/2013 |
| EP | 2650234 | 10/2013 |
| EP | 2712824 | 4/2014 |
| EP | 2721971 | 4/2014 |
| EP | 2757055 | 7/2014 |
| EP | 2757056 | 7/2014 |
| EP | 2868598 | 5/2015 |
| EP | 2892400 | 7/2015 |
| EP | 2960181 | 12/2015 |
| EP | 2570369 | 11/2016 |
| ES | 1076496 | 3/2012 |
| ES | 1077395 | 7/2012 |
| ES | 1078818 | 3/2013 |
| JP | H05132056 A | 5/1993 |
| JP | H05305360 | 11/1993 |
| JP | 2007510598 | 4/2007 |
| JP | 2008517838 | 5/2008 |
| JP | 2009538652 | 11/2009 |
| JP | 4399022 | 1/2010 |
| JP | 2010120161 | 6/2010 |
| JP | 2012515601 | 7/2012 |
| JP | 2012530527 | 12/2012 |
| JP | 2015511506 | 4/2015 |
| JP | 2015526146 | 9/2015 |
| JP | 2015527914 | 9/2015 |
| KR | 20100049650 | 12/2011 |
| KR | 20120030538 | 3/2012 |
| WO | 9729968 | 8/1997 |
| WO | 0226588 | 4/2002 |
| WO | 2004064585 | 8/2004 |
| WO | 2005047126 | 5/2005 |
| WO | 2005066040 | 7/2005 |
| WO | 2006045515 | 5/2006 |
| WO | 2006045536 | 5/2006 |
| WO | 2006045537 A1 | 5/2006 |
| WO | 2007039032 | 4/2007 |
| WO | 2007122208 | 11/2007 |
| WO | 2007137974 | 12/2007 |
| WO | 2008019203 | 2/2008 |
| WO | 2008148646 | 12/2008 |
| WO | 2008148650 | 12/2008 |
| WO | 2008155749 | 12/2008 |
| WO | 2009115474 | 9/2009 |
| WO | 2010006936 | 1/2010 |
| WO | 2010063644 | 6/2010 |
| WO | 2010066705 | 6/2010 |
| WO | 2010076048 A1 | 7/2010 |
| WO | 2010084475 | 7/2010 |
| WO | 2010128844 A1 | 11/2010 |
| WO | 2010137946 | 12/2010 |
| WO | 2010137954 | 12/2010 |
| WO | 2011010263 | 1/2011 |
| WO | 2011061126 | 5/2011 |
| WO | 2011092301 | 8/2011 |
| WO | 2012100836 | 8/2012 |
| WO | 2012100976 | 8/2012 |
| WO | 2012104760 A1 | 8/2012 |
| WO | 2012118367 A1 | 9/2012 |
| WO | 2012120459 | 9/2012 |
| WO | 2012127233 A2 | 9/2012 |
| WO | 2013046014 | 4/2013 |
| WO | 2013053655 | 4/2013 |
| WO | 2013060918 | 5/2013 |
| WO | 2013092910 | 6/2013 |
| WO | 2013132435 A1 | 9/2013 |
| WO | 2013136209 | 9/2013 |
| WO | 2013157924 | 10/2013 |
| WO | 2014012779 | 1/2014 |
| WO | 2014012783 | 1/2014 |

(56) References Cited

FOREIGN PATENT DOCUMENTS

| WO | 2014029803 | 2/2014 |
|---|---|---|
| WO | 2014067507 | 5/2014 |
| WO | 2014118812 | 8/2014 |
| WO | 2014184651 | 11/2014 |
| WO | 2014184652 | 11/2014 |
| WO | 2014184653 | 11/2014 |
| WO | 2015101394 | 7/2015 |
| WO | 2016075319 | 5/2016 |

OTHER PUBLICATIONS

Combined Search and Examination Report, dated Oct. 3, 2013 for United Kingdom Patent Application No. GB1308927.1 (5 pgs.).
Examination Report No. 2 for Standard Patent Application, dated Feb. 24, 2017 for Australian Patent Application No. 2014266922 (5 pgs.).
International Search Report and Written Opinion of the International Searching Authority, dated Jul. 29, 2014 for International Application No. PCT/IB2014/000858 (9 pgs.).
International Search Report, dated Sep. 16, 2014, for International Application No. PCT/IB2014/000957 (5 pgs.).
Notice of Reasons for Rejection, dated Aug. 24, 2016 for Japanese Patent Application No. 2016-512434, with English translation (10 pgs.).
Notice of Reasons for Rejection, with English translation, dated Aug. 24, 2016 for Japanese Patent Application No. 2016-512435 (12 pgs.).
Notice of Reasons for Rejection, with English translation, dated Aug. 24, 2016 for Japanese Patent Application No. 2016-512436 (8 pgs.).
Notification of the First Office Action, dated May 31, 2016 for Chinese Patent Application No. 201480026631.9, with English translation (14 pgs.).
Patent Examination Report No. 1, dated Mar. 2, 2016 for Australian Patent Application No. 2014266922 (3 pgs.).
Patent Examination Report No. 1, dated May 5, 2016 for Australian Patent Application No. 2014266920 (3 pgs.).
Requisition by the Examinar, dated Apr. 8, 2016 for Canadian Patent Application No. 2901582 (3 pgs.).
Requisition by the Examinar, dated Jul. 19, 2016 for Canadian Patent Application No. 2901664 (4 pgs.).
Requisition by the Examinar, dated Jun. 20, 2016 for Canadian Patent Application No. 2901561 (3 pgs.).
Search Report, dated Oct. 1, 2013 for United Kingdom Patent Application No. GB1308925.5 (4 pgs.).
Chinese Search Report for Chinese Application No. 2014800263289, with English translation (3 pgs.).
International Search Report, dated Aug. 28, 2014, for International Application No. PCT/IB2014/000852 (6 pgs.).
Written Opinion of the International Searching Authority for International Application No. PCT/IB2014/000852 (6 pgs.).
Amended claims as filed with the Japanese Patent Office dated Nov. 29, 2016, for Japanese Patent Application No. 2016-512434, with English translation (20 pgs.).
Argument as filed with the Japanese Patent Office on Nov. 29, 2016, for Japanese Patent Application No. 2016-512434, with English translation (6 pgs.).
Response to Office Action, with English translation, for Chinese Application No. 201480026631.9, dated Oct. 17, 2016 (27 pgs.).
Chinese Patent Office, Office Action dated Mar. 28, 2017, from Chinese Patent Application No. 201480026319.X, with English translation (17 pgs.)
Combined Search and Examination Report, dated Apr. 22, 2015, for Applicaiton No. GB1420262.6 (7 pgs.).
International Search Report, dated Feb. 10, 2016, and Written Opinion of the International Searching Authority for International Application No. PCT/EP2015/076620 (12 pgs.).

Extract of the Wikipedia page on "Nespresso" bearing a date of Nov. 29, 2012, https://en.wikipedia.org/w/index.php?title=Nespresso&oldid=525539503, retrieved on Sep. 13, 2018 (D13 in Opposition) (8 pgs.).
Notice of Opposition to a European Patent, dated Oct. 11, 2018 for European Application No. 14730192.3 (7 pgs.).
Statement of Grounds for Notice of Opposition Filed Against EP2996521, dated Oct. 11, 2018 for European Application No. 14730192.3 (124 pgs.).
The State Intellectual Property Office of P.R. China, Notification of the First Office Action and Search Report, with English Summary, for Chinese Application No. 201580072290.3, dated Apr. 10, 2018 (10 pgs.).
Notice of Opposition to a European Patent, dated Jan. 31, 2019 for European Application No. 14730192.3 (34 pgs.).
Notice of Opposition to a European Patent, dated Feb. 2, 2019 for European Application No. 14730192.3 (42 pgs.).
Notice of Opposition to a European Patent, dated Feb. 4, 2019 for European Application No. 14730192.3 (20 pgs.).
Notice of Opposition to a European Patent, dated Feb. 4, 2019 for European Application No. 14730192.3 (10 pgs.).
Coffee Capsule Stress and Deformation Analysis Performed by Optunity Ltd. on Dec. 6, 2018 (10 pgs.).
Extract of the Wikipedia page on "Deformation (engineering)" bearing a date of Feb. 21, 2013, https://en.wikipedia.org/w/index.php?title=Deformation_(engineering)&oldid=539464480, retrieved on Jan. 25, 2019 (5 pgs.).
Extract of the Wikipedia page on "Drawing (manufacturing)" bearing a date of Feb. 26, 2013, https://en.wikipedia.org/w/index.php?title=Drawing_(manufacturing)&oldid=540469785, retrieved on Jan. 25, 2019 (3 pgs.).
The Hague District Court, Judgment in Preliminary Relief Proceedings in the matter between *Koninklijke Douwe Eberts B.V.,* versus *Belmoca BVBA,* case No. C/09/555970/KG ZA 18-694, dated Dec. 28, 2018, with English translation (62 pgs.).
Tribunal de Grande Instance de Paris, Judgment in Preliminary Relief Proceedings in the matter between *Koninklijke Douwe Egberts B.V.,* versus *Belmoca,* case No. 352J-W-B7C-CNM2W, dated Jan. 24, 2019 (17 pgs.).
Response to the Oppositions filed against European patent No. EP2996521, dated Jun. 28, 2019 for European Application No. 14730192.3 (372 pgs.).
Notification of Reason for Refusal dated Aug. 6, 2019, for Korean Patent Application No. 10-2018-7030971, with English Translation (6 pgs.).
Examination Report, dated Aug. 30, 2019 for Australian Patent Application No. 2015344986 (3 pgs.).
Notice of Reasons for Rejection, dated Aug. 22, 2019 for Japanese Patent Application No. 2017-525840, with English Translation (8 pgs.).
Notice of Reasons for Rejection, dated Sep. 20, 2019 for Japanese Patent Application No. 2018-138423, with English Translation (16 pgs.).
Communication pursuant to Article 94(3) EPC and Annex to the Communication, dated Oct. 14, 2019 for European Application No. 14730191.5 (4 pgs.).
Written Submission in Opposition Proceedings filed against European patent No. EP2996521, dated Jan. 29, 2020 for European Application No. 14730192.3 (68 pgs.).
Written Submission in Opposition Proceedings filed against European patent No. EP2996521, dated Jan. 31, 2020 for European Application No. 14730192.3 (23 pgs.).
Extract of the Wikipedia page on "Lamination" published Mar. 18, 2013, https://en.wikipedia.org/w/index.hp?title=Lamination&oldid=545193864, retrieved on Oct. 23, 2019 (3 pgs.).
Annex to the Communication in Opposition Proceedings filed against European patent No. EP2996521, dated Sep. 10, 2019 for European Application No. 14730192.3 (28 pgs.).
United Kingdom Application No. GB 1308925.5, filed May 17, 2013 (33 pgs.).

(56) References Cited

OTHER PUBLICATIONS

United Kingdom Application No. GB 1308929.7, filed May 17, 2013 (28 pgs.).

* cited by examiner

BEVERAGE PREPARATION SYSTEM, A CAPSULE AND A METHOD FOR FORMING A BEVERAGE

CROSS REFERENCE TO RELATED APPLICATIONS

This application is a U.S. national phase application of International Application No. PCT/IB2014/000852, filed May 16, 2014, which claims benefit from Great Britain Application 1308927.1, filed May 17, 2013 which are hereby incorporated herein by their reference in their entirety.

FIELD

The present disclosure relates to a beverage preparation system, a capsule and a method for forming a beverage. The beverage preparation system is of the type comprising a beverage preparation machine wherein the capsule is designed for insertion into the beverage preparation machine to permit a pressurised liquid to be flowed through the capsule in order to produce a beverage from interaction with beverage ingredients contained within the capsule.

BACKGROUND

Beverage preparation systems which comprise a beverage preparation machine and a capsule containing beverage ingredients are known in the art. One such system is taught in EP 1700548, which discloses a capsule comprising a cup-like base body and a closing foil member. The capsule is designed for insertion in a beverage production device in which a liquid under pressure enters the capsule in order to interact with ingredients in the capsule to form a beverage which is output for consumption. The capsule of EP 1700548 is provided with a dedicated sealing member to prevent a by-pass flow of water around the exterior of the capsule in use. The sealing member is in the form of a hollow sealing member on the outer surface of the capsule, for example in the form of a step which is contacted on closure of an enclosing member of the beverage preparation machine.

The present disclosure provides an alternative capsule which may be used as part of such a beverage preparation system. The capsule may be economical to produce and provide effective sealing in use.

SUMMARY OF THE DISCLOSURE

In a first aspect the present disclosure provides a beverage producing system comprising:
a capsule containing beverage ingredients; and
a beverage preparation machine;
the capsule comprising a cup-shaped body and a lid; the cup-shaped body having a base and a side wall and the lid being sealed to the cup-shaped body;
the capsule being designed for insertion into the beverage preparation machine to permit a pressurised liquid to be flowed through the capsule in order to produce a beverage from interaction with the beverage ingredients;
the beverage preparation machine having an enclosing member adapted to be selectively movable between an open position to permit insertion of the capsule into the beverage preparation machine and a closed position in which the enclosing member sealingly engages the capsule;
wherein the side wall is dimensioned to be contacted by the enclosing member on movement of the enclosing member into the closed position to buckle the side wall to form a valley zone bridging the enclosing member;
wherein the side wall is adapted such that said valley zone forms at least one sealing interface between the enclosing member and the side wall.

In a second aspect, the present disclosure provides a capsule for preparing a beverage comprising a cup-shaped body and a lid; the cup-shaped body having a base and a side wall and the lid being sealed to the cup-shaped body;
the capsule being designed for insertion into a beverage preparation machine to permit a pressurised liquid to be flowed through the capsule in order to produce a beverage from interaction with the beverage ingredients;
the beverage preparation machine being of the type having an enclosing member adapted to be selectively movable between an open position to permit insertion of the capsule into the beverage preparation machine and a closed position in which the enclosing member sealingly engages the capsule;
wherein the side wall is dimensioned to be contacted by the enclosing member on movement of the enclosing member into the closed position to buckle the side wall to form a valley zone bridging the enclosing member;
wherein the side wall is adapted such that said valley zone forms at least one sealing interface between the enclosing member and the side wall.

In a third aspect the present disclosure provides a method for preparing a beverage comprising the steps of:
providing a capsule as described above;
providing a beverage preparation machine having an enclosing member;
moving the enclosing member into an open position;
inserting the capsule into the beverage preparation machine;
closing the enclosing member so as to sealingly engage the enclosing member with the capsule;
flowing a pressurised liquid through the capsule to produce a beverage from interaction with the beverage ingredients; and
outputting the beverage for consumption;
wherein on closure of the enclosing member the side wall of the capsule is contacted by the enclosing member to thereby buckle the side wall to produce a valley zone bridging the enclosing member;
wherein said valley zone forms at least one sealing interface between the enclosing member and the side wall.

Advantageously, in the above aspects, buckling of the side wall allows for a relatively large-scale deformation of the side wall to take place to allow formation of the valley zone bridging the enclosing member. This deformation may include folding of the material of the side wall and/or elastic and/or plastic straining of the material of the side wall.
The above aspects may further comprise one or more of the following features:
The valley zone may form a sealing interface with a leading edge of the enclosing member.
The side wall may be adapted such that during closure of the enclosing member the side wall is plastically drawn over the leading edge of the enclosing member. Advantageously this may allow the side wall to be conformed to the shape of any grooves (or similar) provided in the leading edge.
The valley zone may be adapted to be nipped against a capsule holder of the beverage preparation machine part.
The side wall may be adapted to undergo plastic deformation during said buckling.

The side wall may be adapted such that, following buckling of the side wall, the side wall defines a ridge zone located outside the enclosing member. As above, buckling of the side wall allows for a relatively large-scale deformation of the side wall to take place to allow formation of the ridge zone. This deformation may include folding of the material of the side wall and/or elastic and/or plastic straining of the material of the side wall.

The ridge zone may be adapted to be forced inwardly against an outer face of the enclosing member to form a sealing interface with the outer face of the enclosing member.

Advantageously, a sealing interface may be provided with both the leading edge and the outer face of the enclosing member. In addition, the formation of the valley zone may also cause an outward pressure to be exerted by the side wall on the inner face of the enclosing member to form a further sealing interface.

Prior to insertion, the side wall may have a flared shape.

Prior to insertion, at least a portion of the side wall may be concavely curved.

Prior to insertion, the side wall may extend away from the lid at an angle from 45 to 80 degrees.

The capsule may comprise a rim formed at an end of the cup-shaped body remote from the base.

The rim may be formed integrally with the cup-shaped body.

The rim may be formed by a rolled-over portion of the side wall.

Prior to insertion, the capsule may be flangeless except for the optional provision of a rim.

Prior to insertion, the side wall may extend from the base to the rim to define a curved surface without any abrupt angular changes in geometry.

Prior to insertion, the side wall may comprise a pre-selected zone which has been configured or treated to promote a reliable deformation of the side wall. The pre-selected zone may be a circumferential line or band of the side wall. The pre-selected zone may be configured or treated by altering the rigidity, strength, ductility or other suitable material characteristic of the side wall within (or adjacent to) the pre-selected zone to promote reliable deformation of the side wall during closure of the enclosing member. The rigidity, strength, ductility or other suitable material characteristic of the side wall may be altered by one or more of work hardening, localised thickening, creasing, scoring or thinning of the material of the side wall.

Prior to insertion, the side wall may comprise a frusto-conical section proximate the base and a flared section distal the base.

The flared section may extend for a distance of 40 to 80% of a longitudinal height of the capsule or for a distance of 50 to 70% of the longitudinal height of the capsule or for a distance of approximately 60% of the longitudinal height of the capsule.

The lid may be sealed to the side wall at a location radially inside a point of contact, in use, of a leading edge of the enclosing member on the side wall. The lid may be sealed to an inner surface of the side wall. The lid may be sealed at a location on the side wall above the point of contact of the leading edge of the enclosing member. The lid may be positioned a distance of from 2.5 to 3.0 mm from the distal end of the side wall. The distance may be selected to be substantially twice the height of the rim, where present. In one example, the rim may have a height of 1.35 mm and the lid may be located 2.7 mm above the distal end of the side wall. These features singularly or in combination may help to ensure that the enclosing member does not bear down on the capsule so as to trap beverage ingredients in between the leading edge and the capsule holder which may have a detrimental effect on the fluid-tightness of the seal.

The side wall may comprise a distal portion that extends beyond the location where the lid is sealed to the side wall.

The distal portion of the side wall may form a roll-over edge of the capsule.

A leading edge of the enclosing member may comprise a plurality of grooves or indentations, and the side wall may be adapted such that the plastic deformation of the side wall conforms the side wall to the grooves or indentations to provide an effective seal.

The cup-shaped body may be formed from aluminium, an aluminium alloy or a laminate comprising at least one layer formed from aluminium or an aluminium alloy. A lacquer layer may be applied to one or both faces of the cup-shaped body. Alternatively, another, suitably ductile material could be utilised in place of the aluminium or aluminium alloy.

The aluminium alloy may, for example, be of grade 3005, 3105, 8011 or 8079. Preferably, the aluminium alloy will have an 'O' temper rating.

The laminate, where used, may comprise a ductile structural layer formed from a material such as aluminium or an aluminium alloy together with a resilient layer formed from a polymer. The laminate may comprise only a single layer of aluminium or aluminium alloy together with a single layer of polymer together with an optional lacquer layer applied to the aluminium or aluminium alloy.

The polymer layer may, for example, comprise a material selected from the group of: polyvinyl chloride (PVC), polypropylene (PP), low density polyethylene (LDPE), medium density polyethylene (MDPE), high density polyethylene (HDPE), fluorinated ethylene propylene (FEP), polytetrafluoroethylene (PTFE), polyethylene terephthalate (PET), polyamide (PA), ethylene propylene diene monomer (EPDM), polychloroprene or isobutylene.

The lid may be formed from aluminium, an aluminium alloy or a laminate comprising at least one layer formed from aluminium or an aluminium alloy. Alternatively, another, suitably ductile material could be utilised.

The cup-shaped body may be formed from a single integral piece of material. The single piece of material may be cold formed to form the shape of the cup-shaped body, including any flared section. A deep-drawing technique may be used to cold form the cup-shaped body. Where the material of the cup-shaped body comprises a laminate with a polymer layer, a warm-drawing technique may be used where the material is subjected to an increased temperature to promote easier deformation of the polymer material but without detrimental effects on the material characteristics of the aluminium layer.

The cup-shaped body and rim may be integral.

The cup-shaped body may have a thickness in the range of 80 to 500 microns. In some aspects the thickness may be in the range of 90 to 300 microns. Where the cup-shaped body is formed solely from aluminium or an aluminium alloy (optionally with one or more lacquer layers) a thickness in the range of 80 to 120 microns may be preferred. Where the cup-shaped body is formed from a laminate material comprising a polymer layer a thickness in the range 100 to 500 microns is preferred. The thickness of the material may be varied throughout the cup-shaped body.

The rim may have an outer diameter of approximately 37 mm.

Prior to insertion, the capsule may have a height of from 25 to 31 mm. In some aspects the height may be from 29 to 30 mm. Deformation of the capsule during use will tend to reduce the longitudinal height.

The capsule may form a single-use, disposable element.

The capsule may contain a beverage ingredient or mixture of beverage ingredients. As a non-limiting example, the beverage ingredient may comprise roasted ground coffee.

BRIEF DESCRIPTION OF THE DRAWINGS

Examples of the present disclosure will now be described in more detail, for exemplary purposes only, with reference to the accompanying drawings, in which.

DETAILED DESCRIPTION

Figure 3:
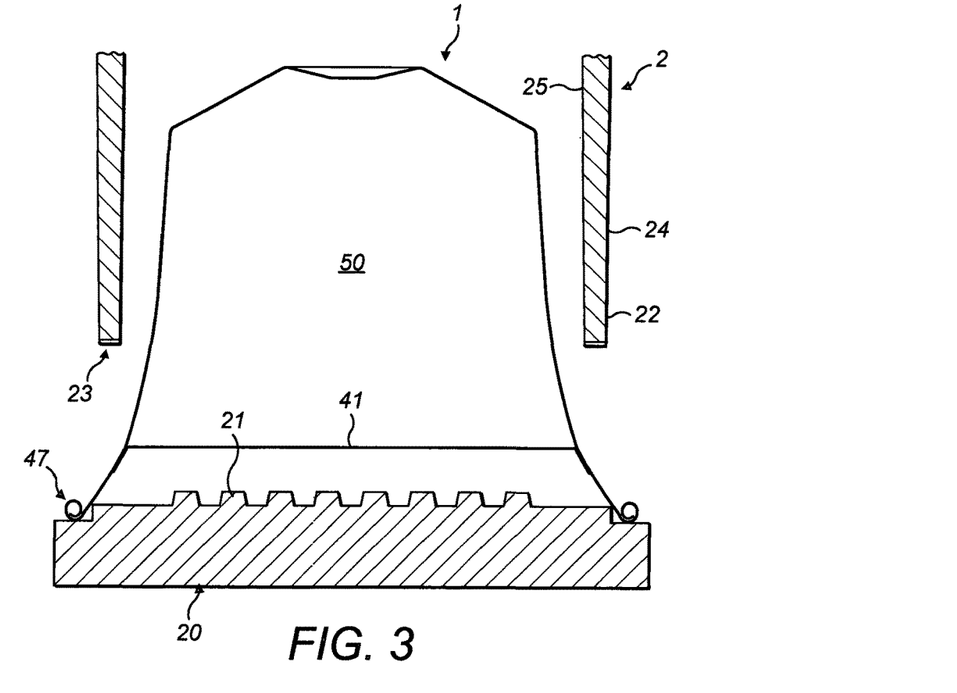
FIG. 3 is a schematic illustration of the capsule of FIG. 1 together with an enclosing member of a beverage preparation machine.

FIG. 3 shows schematically a part of a beverage preparation system according to the present disclosure. The beverage preparation system comprises a beverage preparation machine and a capsule 1.

Figure 1:
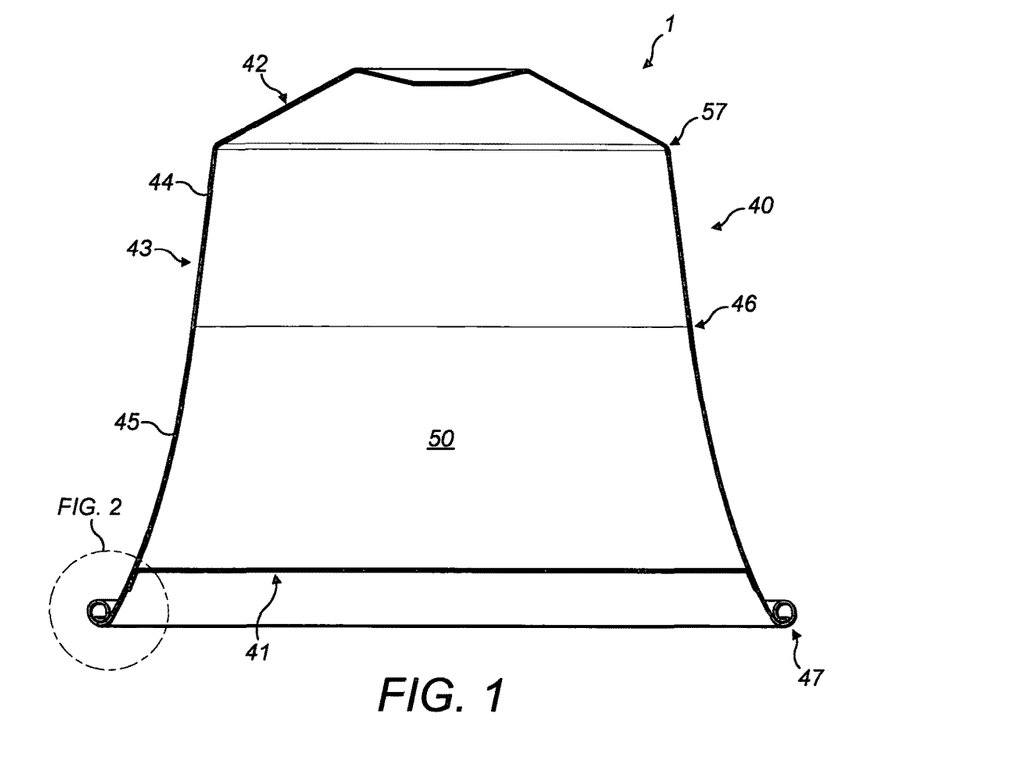
FIG. 1 is a cross-sectional view of a first embodiment of capsule according to the present disclosure.
Figure 2:
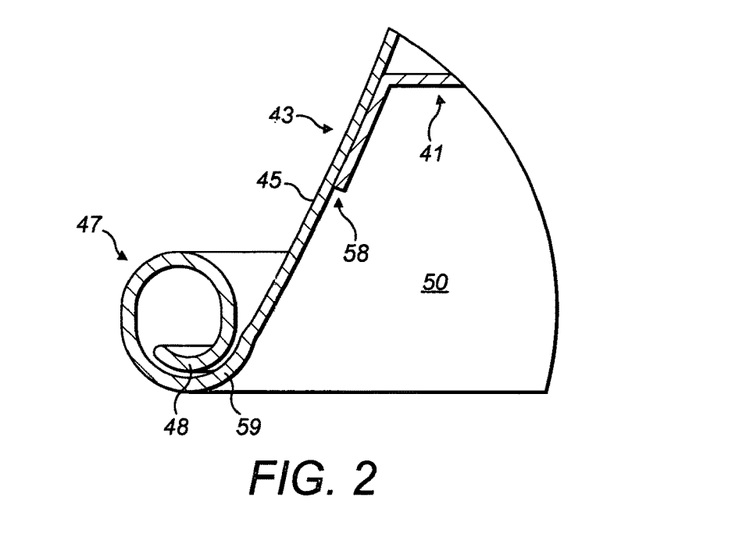
FIG. 2 is an enlarged view of a detail of FIG. 1.

FIGS. 1 and 2 show a first embodiment of capsule 1 according to the present disclosure for use with the beverage preparation machine. The capsule 1 will be described in more detail below but may have the general form of a cup-shaped body 40 having a base 42 at one end and a side wall 43 extending from the base 42 towards an opposed end which is closed-off by a lid 41.

As shown in FIG. 3, the beverage preparation machine comprises an enclosing member 2 and a capsule holder 20. The enclosing member 2 is selectively movable relative to a capsule holder 20 between an open position, to permit insertion of the capsule 1 into the beverage preparation machine, and a closed position, in which the enclosing member sealingly engages the capsule 1 against the capsule holder 20 in a manner that will be described below.

The enclosing member 2 may be moved between the open and closed positions by means of a conventional mechanism well known in the art. For example, the means may involve a mechanical mechanism activated by a manually-movable lever or an automatic or semi-automatic mechanism where movement is driven by a motor. The enclosing member 2 may be moved while the capsule holder 20 remains stationary. Alternatively, the enclosing member 2 may remain stationary and the capsule holder 20 be moved. In a further alternative arrangement, both the enclosing member 2 and the capsule holder 20 may move during the opening and closing operations.

The enclosing member 2 and the capsule holder 20 in the closed position together define a receptacle 3 for holding the capsule 1 during a dispensing operation.

The beverage preparation machine may further comprise other conventional elements which are not illustrated in the accompanying drawings and are well known in the art of beverage preparation machines. For example, the beverage preparation machine may comprise either a facility for, storing an aqueous medium, such as an internal reservoir, or a facility for connection to an external supply of aqueous medium, such as mains water. The aqueous medium will typically be water. A pump or equivalent may be provided for supplying the aqueous medium in a pressurised state to the capsule 1. The aqueous medium will typically be supplied at a pressure of up to 9 to 14 bar. A heater may be provided for heating the aqueous medium to a desired temperature. The heater may heat the aqueous medium in the reservoir (where present) or may heat the aqueous medium on-demand as it passes through a conduit or over a thermoblock to the receptacle 3. The beverage preparation machine may comprise base piercing means for piercing the base 42 of the capsule 1 to permit the aqueous medium to enter the capsule 1 and interact with the beverage ingredients therein. Alternatively, the capsule 1 may be provided with one or more pre-formed openings to allow entry of the aqueous medium from the receptacle 3 into the capsule 1.

The enclosing member 2 may be of the type described in EP 1700548 comprising an annular element 22 having a leading edge 23 in the form of an annular rim, an inner face 25 facing the receptacle 3 and an outer face 24 facing an exterior. The leading edge 23 may be provided with a plurality of grooves as taught in EP 1700548. An upper end (not shown) of the enclosing member 2 may be coupled to a supply of the aqueous medium and may provide a mounting for one or more perforation elements intended to pierce the base 42 of the capsule 1 in use.

The capsule holder 20 may be of the type described in EP 1700548 comprising relief elements 21 which are designed to tear and perforate the lid 41 of the capsule 1. The tearing of the lid 41 may occur due to internal pressurisation of the capsule 1 caused by inflowing aqueous medium. The relief elements 21 may have any protruding shape able to cause a partial tearing of the foil member, e.g. pyramids, needles, bumps, cylinders, or elongated ribs.

As shown in FIG. 1, the capsule 1 of the first embodiment comprises the cup-shaped body 40 and the lid 41 together enclose a beverage ingredient chamber 50 which may be filled with a beverage ingredient or mixture of beverage ingredients. As a non-limiting example, the beverage ingredient may comprise roasted ground coffee.

In the illustrated example, the cup-shaped body 40 is made from aluminium or an aluminium alloy. However, other materials may be utilised. The cup-shaped body 40 includes the base 42 and the side wall 43. There may be, as illustrated, a geometric discontinuity at the junction between the base 42 and the side wall 43, for example, in the form of a shoulder 57. Alternatively, the base 42 and the side wall 43 may have a smooth geometric transition.

The cup-shaped body 40 may have a thickness in the range of 80 to 500 microns. The thickness of the material may be varied throughout the cup-shaped body 40. In the illustrated example the thickness is 120 microns.

The side wall 43 may have a flared shape, wherein the diameter of the capsule at the lid end is greater than at the base 42. The flared shape may be achieved, for example, by configuring the side wall 43 to have at least a portion that is concavely curved when viewed from the exterior of the capsule 1.

The whole axial length of the side wall 43 may be flared, for example concavely curved. Alternatively, only a flared section 45 distal the base 42 may be flared. For example, the flared section 45 may extend for a distance of 40 to 80% of a longitudinal height of the capsule, preferably 50 to 70% of the longitudinal height of the capsule. In one example, the flared section 45 extends for a distance of approximately 60% of the longitudinal height of the capsule.

In the example illustrated in FIG. 1, the side wall 43 comprises a frustoconical section 44 proximate the base 42 and a flared section 45 distal the base 42.

The capsule 1 may be provided with a rim 47 formed at an end of the cup-shaped body 40 remote from the base 42. The rim 47 may be formed integrally with the cup-shaped body 40. In the illustrated example, the rim 47 is formed by a rolled-over portion 48 of the side wall 43.

Where a rim 47 is provided, the side wall 43 may extend from the base 42 to the rim 47 to define a curved surface without any abrupt angular changes in geometry. For example, any transition, e.g. at point 46 as shown in FIG. 1, from a flared section 45 to a frustoconical section 44 (or section of another shape, e.g. cylindrical) can be configured to be smooth.

According to the present disclosure, the capsule 1 may be flangeless except for the optional provision of a rim 47. In other words, the side wall 43 may not include a flange, as taught for example in EP1700548 which extends substantially perpendicularly from the side wall 43.

The lid 41 may be formed from aluminium, an aluminium alloy or a laminate containing aluminium. The lid 41 may be sealed to the side wall 43 at a location 58 radially inside and above a point of contact, in use, of the leading edge 23 of the enclosing member 2 on the side wall 43. For example, the lid 41 may be positioned a distance from the distal end of the side wall 43 which is twice the height of the rim 47. In the illustrated example, the rim 47 may have a height of 1.35 mm. Consequently, the lid 41 may be located 2.7 mm above the distal end of the side wall 43 (which in this case equates to the lowermost edge of the rim 47). This helps to ensure that the enclosing member 2 does not bear down on the capsule 1 so as to trap beverage ingredients in between the leading edge 23 and the capsule holder 20 which could have a detrimental effect on the fluid-tightness of the seal. To achieve this, the lid 41 may be sealed to the flared section 45 of the side wall 43 and not, as in the prior art, to a flange that extends substantially perpendicularly to the side wall.

The side wall 43 may comprise a distal portion 59 that extends beyond the location 58 where the lid 41 is sealed to the side wall 43. The distal portion 59 may include the rolled-over portion 48 of the rim 47, where present.

In use of the beverage preparation system, the enclosing member 2 is first moved into the open position and the capsule 1 is inserted into a location in between the capsule holder 20 and the enclosing member 2. Depending on the design of the beverage preparation machine, the capsule 1 may be inserted by gravity or by manual placement or a combination thereof. In addition, the initial insertion may place the capsule 1 in proximity to the enclosing member 2 such that subsequent movement of the enclosing member 2 carries the capsule 1 therewith into engagement with the capsule holder 20. Alternatively, initial insertion may place the capsule 1 in proximity to the capsule holder 20 such that the capsule 1 remains substantially stationary during closure of the enclosing member 2.

The enclosing member 2 is then closed so as to sealingly engage the enclosing member 2 with the capsule 1. During this step the base 42 of the capsule 1 may be pierced by the perforation elements of the enclosing member 2.

Pressurised aqueous medium is then flowed into the capsule 1 to produce a beverage from interaction with the beverage ingredients. During this step internal pressurisation of the beverage ingredient chamber 50 causes the lid 41 to be deformed outwardly against the relief elements 21 of the capsule holder 20 resulting in at least partial tearing of the lid 41 which opens up an exit path from the capsule 1 for the beverage.

The beverage is then output for consumption.

Figure 4:
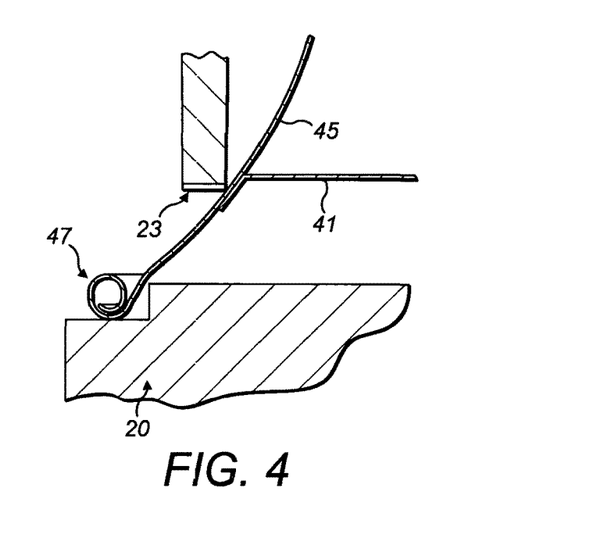
FIG. 4 is an enlarged view of a detail of FIG. 3.
Figure 5:
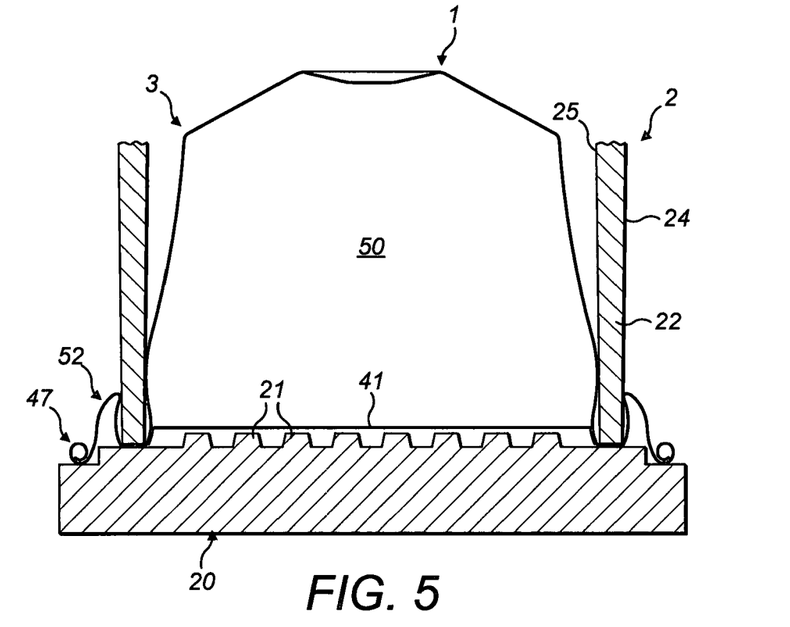
FIG. 5 is a schematic illustration of the arrangement of FIG. 3 with the enclosing member in a closed position.

As shown in FIGS. 4 and 5, during the step of closing the enclosing member 2 relative to the capsule holder 20 the side wall 43 of the capsule 1 is contacted by the enclosing member 2 to thereby buckle the side wall 43 to produce a valley zone 51 bridging the enclosing member 2. The valley zone 51 forms at least one sealing interface between the enclosing member 2 and the side wall 43.

The point of contact between the leading edge 23 of the annular element 22 and the capsule 1 is on the flared section 45 of the side wall 43. Importantly, the point of contact is at a point on the side wall 43 which is axially spaced from the capsule holder 20 such that there is room for the side wall 43 to deform downwards towards the capsule holder 20 enough to allow for formation of the valley zone 51 before the side wall 43 is nipped against the capsule holder 20. The buckling and induced movement of the side wall 43 causes the side wall 43 to undergo plastic deformation. In particular, as the side wall 43 is deformed downwards, the side wall 43 may be plastically drawn over the leading edge 23 of the enclosing member 2 which encourages the material of the side wall 43 to be closely conformed to the grooves of the leading edge 23. Thus, the valley zone 51 may form a sealing interface with the leading edge 23 of the enclosing member 2.

The formation of the valley zone 51 may also form a ridge zone 52 which is located outside the enclosing member 2 when it reaches the closed position. As shown most clearly in FIG. 6, the ridge zone 52 may comprise an annular feature having an inner wall 54 adjacent the outer face 24 of the annular element 22 and an outer wall 55 facing away from the enclosing member 2. An apex 53 of the ridge zone 52 points back towards the base 42 of the capsule 1. Compression of the material of the ridge zone 52 during deformation may cause the apex 53 and/or the inner wall 54 of the ridge zone 52 to be forced inwardly against the outer face 24 to form a sealing interface with the enclosing member 2.

Figure 6:
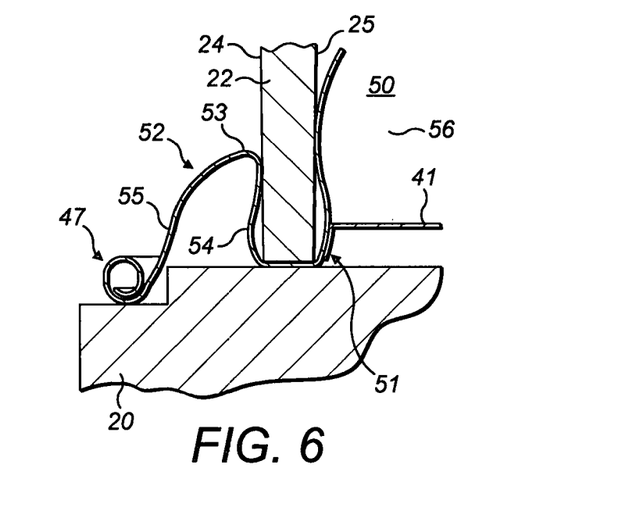
FIG. 6 is an enlarged view of a detail of FIG. 5.

Further, the formation of the valley zone 51 may also cause an outward pressure to be exerted by the side wall 43 on the inner face 25 of the enclosing member 2 to form a further sealing interface.

Where the capsule 1 comprises a side wall 43 formed from a laminate material as discussed above having a polymer layer, closure of the enclosing member 2 may compress at least the polymer layer of the laminate material when forming any of the sealing interfaces mentioned above. The compression of the polymer layer may aid the conforming of the side wall 43 to the shape of the leading edge 23. In particular the polymer layer may aid filling of any gaps arising due to the presence of grooves in the leading edge 23. Preferably, the polymer layer is directed outwardly to be directly contacted by the leading edge 23. In addition, during use the hot water passed through the receptacle 3 may act to slightly soften the material of the polymer layer. Such softening may lead to further deformation of the side wall 43 under the compressive loading of the enclosing member 2. This effect may help to reinforce the fluid seal between the enclosing member 2 and the capsule 1 by tending to seal up any gaps having hot water leaking there through.

The formation of the valley zone 51 will also typically cause a reduction in the longitudinal height, of the capsule 1 relative to its height prior to insertion.

FIGS. 7 to 10 shows further variants of capsule 1 according to the present disclosure. Corresponding features of the first embodiment and these variants are denoted by corresponding reference signs. Features of the first embodiment and these variants may be interchanged as desired.

Figure 7:
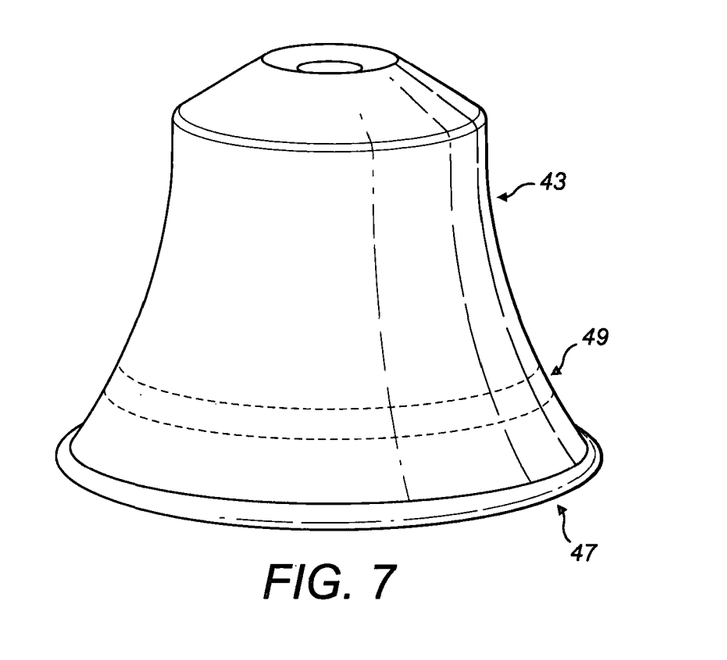
FIG. 7 is a perspective view of a further embodiment of capsule according to the present disclosure.
Figure 9:
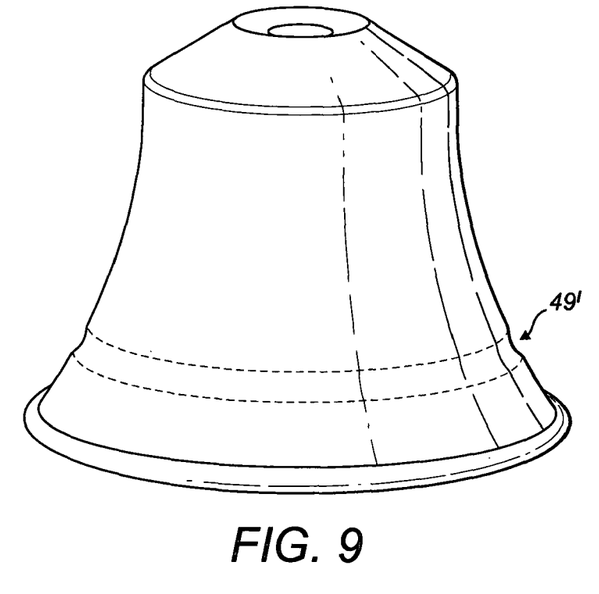
FIG. 9 is a perspective view of a further embodiment of capsule according to the present disclosure.

Prior to insertion, the side wall 43 is provided with a pre-selected zone in order to promote reliable buckling and formation of the valley zone 51. The pre-selected zone may be a circumferential line or band of the side wall 43. The pre-selected zone may be configured or treated by altering the rigidity, strength, ductility or other suitable material characteristic of the side wall 43 within (or adjacent to) the pre-selected zone to promote reliable deformation of the side wall during closure of the enclosing member 2. The rigidity, strength, ductility or other suitable material characteristic of the side wall 43 may be altered by one or more of work hardening, localised thickening, creasing, scoring or thinning of the material of the side wall.

For example, as illustrated in FIG. 7, a work hardened circumferential band 49 may be formed around the side wall 43. The work hardening may be achieved by creasing and uncreasing the side wall material or by other suitable means.

Alternatives to a work hardened band include the side wall 43 being provided with a zone of increased thickness or alternatively a thinned section of material 49' as shown in FIG. 9; the side wall 43 being provided with a score line in the side wall 43; or a section of the side wall being subjected to thermal treatment, either before or after drawing.

Figure 8:
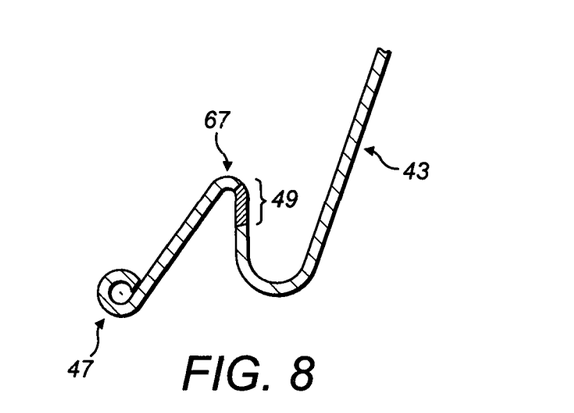
FIG. 8 shows a schematic cross-section through a part of the capsule of FIG. 7 after insertion into a beverage preparation machine.
Figure 10:
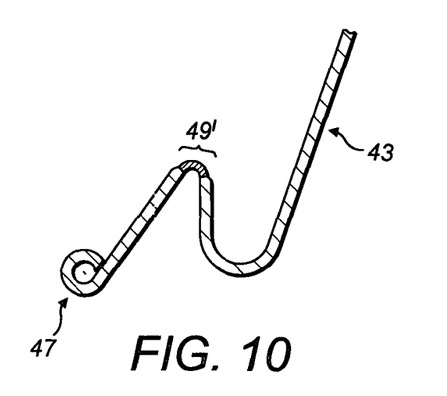
FIG. 10 shows a schematic cross-section through a part of the capsule of FIG. 9 after insertion into a beverage preparation machine.

During closure of the enclosing member 2 the work hardened band 49 is more resistant to bucking than adjacent zones of the side wall 43. Therefore, as shown in FIG. 8, the apex 67 of the ridge zone 63 will reliably be formed at an interface between the work hardened band 49 and the adjacent portion of the side wall 43. A similar mechanism takes place where a localised thickened portion of the side wall 43 is provided. Conversely, where the side wall 43 is weakened locally by, for example, the thinned section 49' or scoring, buckling is promoted at this point. Consequently, the apex 67 of the ridge zone will be reliably be formed by material within the thinned section 49'/at the score line as shown in FIG. 10.

The invention claimed is:

1. A beverage producing system comprising:
a capsule containing beverage ingredients; and
a beverage preparation machine;
the capsule comprising a cup-shaped body and a lid; the cup-shaped body having a base and a side wall and the lid being sealed to the cup-shaped body;
the capsule being designed for insertion into the beverage preparation machine to permit a pressurised liquid to be flowed through the capsule in order to produce a beverage from interaction with the beverage ingredients;
the beverage preparation machine having an enclosing member adapted to be selectively movable between an open position to permit insertion of the capsule into the beverage preparation machine and a closed position in which the enclosing member sealingly engages the capsule;
wherein prior to insertion the side wall comprises a flared section distal the base;
wherein the flared section is dimensioned to be contacted by the enclosing member on movement of the enclosing member into the closed position to buckle the flared section to form a valley zone bridging the enclosing member and a ridge zone located outside the enclosing member; and
wherein the side wall is adapted such that said valley zone forms at least one sealing interface between the enclosing member and the side wall.

2. A beverage producing system as claimed in claim 1, wherein the valley zone forms a sealing interface with a leading edge of the enclosing member.

3. A beverage producing system as claimed in claim 1, wherein the side wall is adapted such that during closure of the enclosing member the side wall is plastically drawn over the leading edge of the enclosing member.

4. A beverage producing system as claimed in claim 1, wherein the valley zone is adapted to be nipped against a capsule holder of the beverage preparation machine part.

5. A beverage producing system as claimed in claim 1 wherein the side wall is adapted to undergo plastic deformation during said buckling.

6. A beverage producing system as claimed in claim 1, wherein the ridge zone is adapted to be forced inwardly against an outer face of the enclosing member to form a sealing interface with the outer face of the enclosing member.

7. A beverage producing system as claimed in claim 1, wherein the capsule comprises a rim formed at an end of the cup-shaped body remote from the base; and optionally the rim is formed integrally with the cup-shaped body.

8. A beverage producing system as claimed in claim 1, wherein prior to insertion, the capsule is flangeless except for the optional provision of a rim formed by a rolled-over portion of the side wall.

9. A beverage producing system as claimed in claim 1, wherein prior to insertion, the side wall extends from the base to the rim to define a curved surface without any abrupt angular changes in geometry.

10. A beverage producing system as claimed in claim 1, wherein prior to insertion, the side wall comprises a pre-selected zone which has been configured or treated to promote a reliable deformation of the side wall.

11. A beverage producing system as claimed in claim 1, wherein prior to insertion, the side wall comprises a frustoconical section proximate the base; and optionally the flared section extends for a distance of 40 to 80% of a longitudinal height of the capsule; optionally for a distance of 50 to 70% of the longitudinal height of the capsule; optionally for a distance of approximately 60% of the longitudinal height of the capsule.

12. A beverage producing system as claimed in claim 1, wherein the lid is sealed to the side wall at a location radially inside a point of contact, in use, of a leading edge of the enclosing member on the side wall; and optionally the side wall comprises a distal portion that extends beyond the location where the lid is sealed to the side wall; and optionally the distal portion of the side wall forms a roll-over edge of the capsule.

13. A beverage producing system as claimed in claim 1, wherein a leading edge of the enclosing member comprises a plurality of grooves or indentations, and the side wall is adapted such that the plastic deformation of the side wall conforms the side wall to the grooves or indentations to provide an effective seal.

14. A capsule for preparing a beverage comprising a cup-shaped body and a lid; the cup-shaped body having a base and a side wall and the lid being sealed to the cup-shaped body;

the capsule being designed for insertion into a beverage preparation machine to permit a pressurised liquid to be flowed through the capsule in order to produce a beverage from interaction with the beverage ingredients;

the beverage preparation machine being of the type having an enclosing member adapted to be selectively movable between an open position to permit insertion of the capsule into the beverage preparation machine and a closed position in which the enclosing member sealingly engages the capsule;

wherein the side wall comprises a flared section, and wherein the flared section is dimensioned to be contacted by the enclosing member on movement of the enclosing member into the closed position to buckle the flared section to form a valley zone bridging the enclosing member and a ridge zone located outside the enclosing member;

wherein the side wall is adapted such that said valley zone forms at least one sealing interface between the enclosing member and the side wall.

15. A capsule as claimed in claim 14 wherein the side wall is adapted to undergo plastic deformation during said buckling.

16. A capsule as claimed in claim 14, wherein the capsule comprises a rim formed at an end of the cup-shaped body remote from the base; and optionally the rim is formed integrally with the cup-shaped body.

17. A capsule as claimed in claim 14, wherein the side wall extends from the base to the rim to define a curved surface without any abrupt angular changes in geometry.

18. A capsule as claimed in claim 14, wherein the side wall comprises a pre-selected zone which has been configured or treated to promote a reliable deformation of the side wall.

19. A capsule as claimed in claim 14, wherein the capsule is flangeless except for the optional provision of a rim formed by a rolled-over portion of the side wall.

20. A capsule as claimed in claim 14, wherein the side wall comprises a frustoconical section proximate the base and a flared section distal the base; and optionally the flared section extends for a distance of 40 to 80% of a longitudinal height of the capsule; optionally for a distance of 50 to 70% of the longitudinal height of the capsule; optionally for a distance of approximately 60% of the longitudinal height of the capsule.

21. A capsule as claimed in claim 14, wherein the lid is sealed to the side wall at a location radially inside a point of contact, in use, of a leading edge of the enclosing member on the side wall; and optionally the side wall comprises a distal portion that extends beyond the location where the lid is sealed to the side wall; and optionally the distal portion of the side wall forms a roll-over edge of the capsule.

22. A capsule as claimed in claim 14, wherein the cup-shaped body is formed from aluminium, an aluminium alloy or a laminate comprising at least one layer formed from aluminium or an aluminium alloy.

23. A capsule as claimed in claim 14, wherein the lid is formed from aluminium, an aluminium alloy or a laminate comprising at least one layer formed from aluminium or an aluminium alloy.

24. A method for preparing a beverage comprising the steps of:

providing a capsule as claimed in claim 14;
providing a beverage preparation machine having an enclosing member;
moving the enclosing member into an open position;
inserting the capsule into the beverage preparation machine;
closing the enclosing member so as to sealingly engage the enclosing member with the capsule;
flowing a pressurised liquid through the capsule to produce a beverage from interaction with the beverage ingredients; and
outputting the beverage for consumption;
wherein on closure of the enclosing member the side wall of the capsule is contacted by the enclosing member to thereby buckle the side wall to produce a valley zone bridging the enclosing member;
wherein said valley zone forms at least one sealing interface between the enclosing member and the side wall.

25. The method of claim 24 wherein the side wall undergoes plastic deformation during said buckling.

26. The method of claim 24, wherein the valley zone forms a sealing interface with a leading edge of the enclosing member; and optionally the side wall is plastically drawn over the leading edge of the enclosing member; and optionally the valley zone is nipped against a capsule holder of the beverage preparation machine part.

27. The method of claim 24, wherein buckling of the side wall forms a ridge zone located outside the enclosing member; and optionally the ridge zone is forced inwardly against an outer face of the enclosing member to form a sealing interface with the outer face of the enclosing member.

28. The method of claim 24, wherein a leading edge of the enclosing member comprises a plurality of grooves or indentations, and the side wall is plastically deformed to conform the side wall to the grooves or indentations to provide an effective seal.

* * * * *